United States Patent [19]
Auger et al.

[11] Patent Number: 5,812,092
[45] Date of Patent: Sep. 22, 1998

[54] RADIOCOMMUNICATIONS AND LOCALIZING DEVICE

[75] Inventors: Gérard Auger, Champagne s/Oise; Olivier Bacelon, Paris, both of France

[73] Assignee: Thomson-CSF, Paris, France

[21] Appl. No.: 770,324

[22] Filed: Dec. 20, 1996

[30] Foreign Application Priority Data

Jan. 23, 1996 [FR] France .................................. 96 00725

[51] Int. Cl.$^6$ ....................................................... G01S 5/04
[52] U.S. Cl. ......................... 342/441; 342/440; 342/431
[58] Field of Search .................................. 342/440, 441, 342/431

[56] References Cited

U.S. PATENT DOCUMENTS

| | | | |
|---|---|---|---|
| 3,816,833 | 6/1974 | Ryan | 342/441 |
| 3,872,477 | 3/1975 | King . | |
| 4,318,106 | 3/1982 | Medtke | 342/440 |
| 4,475,106 | 10/1984 | Andrews . | |
| 4,945,312 | 7/1990 | Auger et al. . | |
| 5,307,509 | 4/1994 | Michalon et al. . | |

FOREIGN PATENT DOCUMENTS 0 675 373  10/1995  European Pat. Off. .

OTHER PUBLICATIONS

Patent Abstracts of Japan, vol. 8, No. 142, (E–254), Jul. 3, 1984, JP–A–59–052927, (Honda Giken Kogyo KK.), Mar. 27, 1984, Abridged.

*Primary Examiner*—Thomas H. Tarcza
*Assistant Examiner*—Dao L. Phan
*Attorney, Agent, or Firm*—Oblon, Spivak, McClelland, Maier & Neustadt, P.C.

[57] ABSTRACT

A radiocommunications and localization device of the type comprising an array of antennas coupled respectively to a goniometer device and a radio receiver delivering phonic signals to an operator respectively on two headphones. This device includes a device to identify the position of the operator's head and a device for the generation of phonic signals that is coupled to the goniometer device, the radio receiver and the identifying device for the application, respectively to the headphones, of the mutually phase-shifted phonic signals so as to give the operator the impression that the phonic signal that he hears is coming from the direction of arrival of the radiowaves determined by the goniometer device. The applications of this device relate to the radio-localization of persons moving in groups.

9 Claims, 1 Drawing Sheet

RADIOCOMMUNICATIONS AND LOCALIZING DEVICE

BACKGROUND OF THE INVENTION

1. Field of the Invention

The present invention relates to a radiocommunications and localizing device that enables a listener provided with headphones to localize his conversation partners.

2. Description of the Prior Art

Among terrestial localizing systems, there is a known way of using radiogoniometers. These systems provide for the measurement of the angle of arrival of electromagnetic waves at antennas. Their usefulness lies in the fact that they enable an operator either to locate his position within a determined geographic zone in relation for example to a set of radioelectrical transmission beacons or again, by using several radiogoniometers, to have general knowledge of the geographical position of several sources of radioelectrical transmission.

These systems are appropriate for the positioning and guiding of mechanized moving bodies but they are very restrictive for users moving on foot who have to move in groups in an environment that may be hostile or in which it is imperative that each person on foot should have precise as well as swift knowledge of his real geographical position as well as his position with respect to other members of the group travelling on foot. This type of situation is encountered especially in the military field for the regrouping for example of paratroopers. It may also be encountered in the civilian field for the guiding of pedestrians in an exhibition. In the present state of radiocommunications, the only means that can be used in this case are phonic transmission means by which each operator can define his own position in relation to others in the group through the contents of the messages that he receives. However, the information given in these messages remains insufficient and imprecise for the swift locating of a conversation partner and in any case does not make it easy to obtain swift coordination of actions and especially of the movements of the group.

SUMMARY OF THE INVENTION

The invention is aimed at overcoming the above-mentioned drawbacks.

To this end, an object of the invention is a radiocommunications and localization device of the type comprising an array of antennas coupled respectively to a goniometer device and a radio receiver delivering phonic signals to an operator respectively on two headphones, where said device comprises a device to identify the position of the operator's head and a device for the generation of phonic signals coupled to the goniometer device, the radio receiver and the identifying device for the application, respectively to the headphones, of the mutually phase-shifted phonic signals so as to give the operator the impression that the phonic signal that he hears is coming from the direction of arrival of the radiowaves determined by the goniometer device.

An advantage of the invention is that it can be used, through the array of reception antennas, for the association, with each audiofrequency signal received, of a direction of space that is restituted in the headphones of the operator in making the latter believe that the sound comes not from the headphones but from a precise point in space in which his conversation partner is located.

It also has the advantage of making it possible to identify the direction from which the transmissions are coming by giving the operator an impression of distance without the transmitters and receivers being necessarily in direct line of view while at the same time enabling the reception of several simultaneous transmissions.

BRIEF DESCRIPTION OF THE DRAWINGS

Other features and characteristics of the invention shall appear from the following description made with reference to the appended drawings, of which.

MORE DETAILED DESCRIPTION

Figure 1:
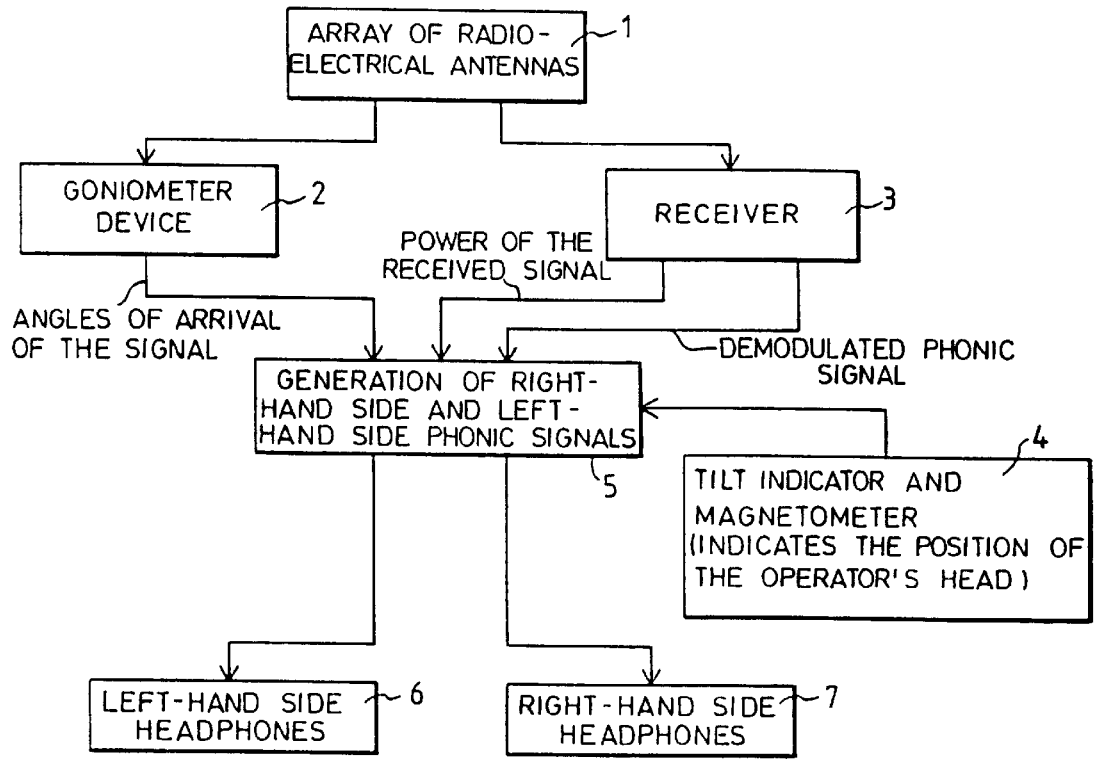
FIG. 1 shows an embodiment of a receiver according to the invention.

The device according to the invention shown in FIG. 1 has an array of antennas 1 respectively coupled to a goniometer device 2 and a radio receiver 3. It also has an identifying device 4 that the operator wears on his head and consists, for example, of a magnetometer, a tilt indicator or any other equivalent device that can be used to determine the orientation of the head in relation to fixed directions of space such as for example the geographical north or the horizontal plane of the place. A device for the generation of phonic signals 5 coupled to the goniometer device 2, the radio receiver 3 and the identifying device 4 gives phonic signals to two headphones, namely left-hand side and right-hand side headphones 6 and 7. The transmitter, not shown, may be associated with the device to transmit phonic messages possibly matched with synchronization patterns in an omnidirectional way.

The goniometer device 2 and the radio receiver 3 work in parallel. When the goniometer device 2 detects RF activity, it attempts to determine the direction θ1 of origin of this RF activity by performing, for example, as described in the French patent application 2 718 246, computations of phase difference between the signals received at each pair of antennas of the array 1. Should an array be formed solely by two antennas spaced out by a length d, the computation of the direction of arrival θ1 of a radiotransmission may be obtained by the relationship:

$$\theta_1 = A rcsin(\gamma \cdot \phi / 2\pi d) \quad (1)$$

Figure 2:
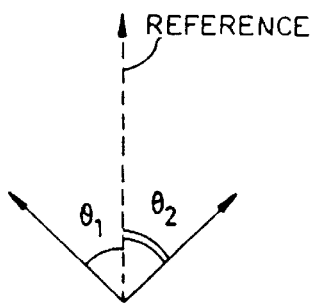
FIG. 2 shows a vector composition enabling the determining of the direction from which an audiofrequency signal comes with respect to an operator's head.

The angle $\theta_1$ is added in the signal generator device 5, in accordance with the vector composition of FIG. 2, to an angle $\theta_2$ given by the identifying device 4 representing the orientation of the operator's head with respect to the reference direction. The result of this addition gives an angle θ that represents the direction θ from which the radio signal comes with respect to the head. The direction from which the radio signal comes defined by the angle θ is used in the signal generator device 5 to phase-shift the excitation signals of the headphones 6 and 7 and give the operator the impression that the sound signal that he is hearing comes from the direction θ and not from the headphones. This can be done for example by means of a phase shift φ on each frequency F of the voice signal possibly obtained by means of a known fast Fourier transform computation, according to a relationship having the following form:

$$\phi = 2\pi Fa \cdot \sin\theta/V \qquad (2)$$

wherein:

a represents the distance between the operator's two ears, and V represents the speed of sound.

The relationship (2) reflects the difference in time needed to simulate the difference in the speed of the sound signal that is supposed to come from a distant point of space, successively or simultaneously reaching each of the ears along the angle θ of origin.

Figure 3:
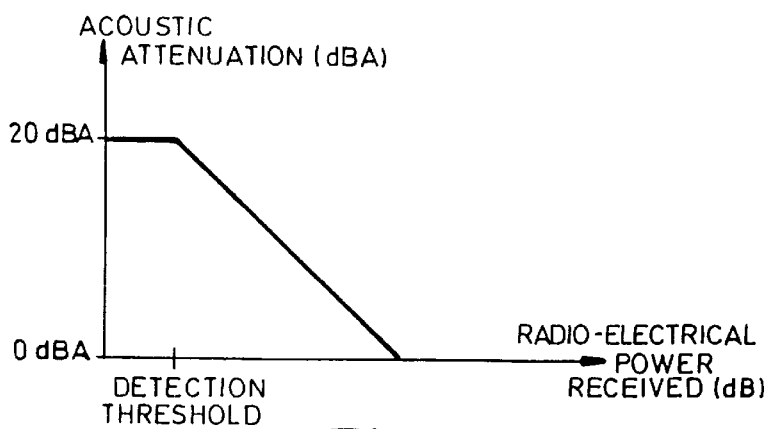
FIG. 3 shows a vector composition that enables an operator to be given the impression that he receives the sound from a precise point of the space in which his conversation partner is located.

Since the power of the radioelectrical signals received depends on the distance between the device according to the invention and the transmission source, a device (not shown) makes it possible, in the signal generator device 5, to make the mean power of the sound signal applied to the headphones proportional to the power of the radio signal received to give the operator the possibility of accessing the difference between the transmitter and the transmission that he receives. Naturally, this device is valid only if the mean power values of the transmission sources have been previously calibrated. The weakening of the sound signal may be obtained in a manner shown by the graph of FIG. 3.

The device described here above is more particularly suited to a configuration of transmission that has only one transmitter. In this case, it may comprise a digital radio station at a fixed frequency compatible with that of the transmitter and a multiple-channel radiogoniometer with five antennas for example, the frequency band of which is compatible with that of the radio receiver. For a configuration comprising several transmitters, it is possible to envisage the positioning of a multiple-channel receiver enabling the reception of several conversations simultaneously and a multiple-channel radiogoniometer to identify each of the directions of arrival of the corresponding radiotransmissions. Consequently, the operator can follow several simultaneous conversations and localize the direction of origin of each of them.

The exploitation of the device by persons on foot is facilitated by the use of high traffic frequencies, namely frequencies of over 1 GHZ for example, so as to make it possible, by using known metallization techniques, to integrate the array of antennas into a headphone set. In this case, the device can be simplified by using a goniometer capable of identifying the angle of arrival of the transmissions in all three dimensions of space. This makes it possible, owing to the fact that the antennas are worn by the helmet, to eliminate the need to use a device for the localizing of the array of antennas with respect to the operator's head.

Naturally, the embodiments of the invention are not unique and other variants may be made as a function of the modes of communication and the means of radiogoniometry used. These variants may also depend on the types of message transmitted. For example, if the messages are transmitted in the form of digital data, it is enough to use a voice synthesis device to convert these messages into phonic signals.

What is claimed is:

1. A radiocommunications and localization device of the type comprising an array of antennas coupled respectively to a goniometer device and a radio receiver delivering phonic signals to an operator respectively on two headphones, where said device comprises;

an identifying device to identify the position of the operator's head; and a generating device for the generation of phonic signals that is coupled to the goniometer device, the radio receiver and the identifying device;

said generating device applying, respectively to the headphones, mutually phase-shifted phonic signals so as to give the operator the impression that a heard phonic signal is coming from a direction of arrival of the radiowaves determined by the goniometer device.

2. A device according to claim 1, wherein the identifying device comprises a tilt indicator and a magnetometer firmly attached to the operator's head.

3. A device according to claim 1, wherein the identifying device is formed by the array of antennas.

4. A device according to any of the claims 1 to 3, wherein the generating device applies phonic signals to the headphones with a mean power proportional to the power of the radio signal received.

5. A device according to any of the claims 1 to 3, wherein the radio receiver and the radiogoniometer are multiple-channel receivers.

6. A device according to any of the claims 1 to 3, wherein the receiver comprises a voice synthesis device to convert digital messages into phonic messages.

7. A device according to claim 4, wherein the radio receiver and the radio goniometer are multiple-channel receivers.

8. A device according to claim 4, wherein the receiver comprises a voice synthesis device to convert digital messages into phonic messages.

9. A device according to claim 5, wherein the receiver comprises a voice synthesis device to convert digital messages into phonic messages.

* * * * *